(12) United States Patent
Park et al.

(10) Patent No.: US 12,523,850 B2
(45) Date of Patent: Jan. 13, 2026

(54) OPTICAL IMAGING SYSTEM INCLUDING SEVEN LENSES OF +-+-++- OR +-+--+- REFRACTIVE POWERS

(71) Applicant: Samsung Electro-Mechanics Co., Ltd., Suwon-si (KR)

(72) Inventors: Il Yong Park, Suwon-si (KR); Hyo Jin Hwang, Suwon-si (KR); Yong Joo Jo, Suwon-si (KR); Min Hyuk Im, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/104,442

(22) Filed: Feb. 1, 2023

(65) Prior Publication Data

US 2023/0176339 A1    Jun. 8, 2023

Related U.S. Application Data

(63) Continuation of application No. 16/750,052, filed on Jan. 23, 2020, now Pat. No. 11,860,342.

(30) Foreign Application Priority Data

Oct. 15, 2019    (KR) .................. 10-2019-0127853

(51) Int. Cl.
G02B 13/00    (2006.01)
G02B 9/64    (2006.01)

(52) U.S. Cl.
CPC .......... *G02B 13/0045* (2013.01); *G02B 9/64* (2013.01)

(58) Field of Classification Search
CPC .................. G02B 13/0045; G02B 9/64
See application file for complete search history.

(56) References Cited

U.S. PATENT DOCUMENTS

| | | | |
|---|---|---|---|
| 9,706,093 | B2 | 7/2017 | Chen |
| 10,139,598 | B1 | 11/2018 | Wang et al. |
| 11,573,408 | B2 | 2/2023 | Hsu et al. |
| 2016/0085052 | A1 | 3/2016 | Park |

(Continued)

FOREIGN PATENT DOCUMENTS

| | | |
|---|---|---|
| CN | 107678132 A | 2/2018 |
| CN | 107817584 A | 3/2018 |

(Continued)

OTHER PUBLICATIONS

Korean Office Action Issued on Feb. 18, 2023, in Counterpart Korean Patent Application No. 10-2022-0079040 (8 Pages in English, 5 Pages in Korean).

(Continued)

*Primary Examiner* — Wen Huang
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens, sequentially arranged from an object side, wherein TTL/(2*Img HT)<0.7, where a distance on an optical axis from an object-side surface of the first lens to an imaging plane of an image sensor is TTL, and half of a diagonal length of the imaging plane of the image sensor is Img HT, and Fno <1.9, where an F-number of the optical imaging system is Fno.

16 Claims, 10 Drawing Sheets

(56) References Cited

U.S. PATENT DOCUMENTS

| | | |
|---|---|---|
| 2016/0241756 A1 | 8/2016 | Chen |
| 2017/0038567 A1 | 2/2017 | Wang et al. |
| 2018/0180855 A1 | 6/2018 | Baik et al. |
| 2018/0239115 A1 | 8/2018 | Hsu et al. |
| 2019/0004285 A1 | 1/2019 | Tang et al. |
| 2019/0146184 A1 | 5/2019 | Xu et al. |
| 2019/0154967 A1 | 5/2019 | Son et al. |
| 2019/0227279 A1* | 7/2019 | Yang .............. G02B 13/0045 |
| 2019/0227282 A1 | 7/2019 | Son et al. |
| 2020/0064595 A1 | 2/2020 | Huang |
| 2020/0209546 A1 | 7/2020 | Zhao et al. |
| 2020/0209547 A1 | 7/2020 | Bian et al. |
| 2020/0225449 A1 | 7/2020 | Zirkel et al. |
| 2020/0249434 A1 | 8/2020 | Lin et al. |
| 2021/0048643 A1 | 2/2021 | Lin et al. |
| 2021/0072507 A1 | 3/2021 | Huang |
| 2021/0103129 A1 | 4/2021 | Ji et al. |
| 2021/0109316 A1 | 4/2021 | Jhang et al. |
| 2021/0239947 A1 | 8/2021 | Geng et al. |

FOREIGN PATENT DOCUMENTS

| | | |
|---|---|---|
| CN | 109358416 A | 2/2019 |
| CN | 109613679 A | 4/2019 |
| CN | 109683294 A | 4/2019 |
| CN | 110068914 A | 7/2019 |
| KR | 10-1471963 B1 | 12/2014 |
| KR | 10-1670130 B1 | 10/2016 |
| KR | 10-1748104 B1 | 6/2017 |
| KR | 10-2018-0075151 A | 7/2018 |
| KR | 10-2018-0103809 A | 9/2018 |
| KR | 10-2019-0057664 A | 5/2019 |

OTHER PUBLICATIONS

U.S. Office Action issued on Nov. 2, 2023, in related U.S. Appl. No. 17/892,195 (9 pages).

Korean Office Action issued on Oct. 28, 2020 in counterpart Korean Patent Application No. 10-2019-0127853 (5 pages in English and 5 pages in Korean).

Korean Office Action Issued on Apr. 30, 2021, in Counterpart Korean Patent Application No. 10-2019-0127853 (5 pages in English and 4 in Korean).

Chinese Office Action issued on Jan. 6, 2022, in counterpart Chinese Patent Application No. 202010316372.0 (3 pages in English and 5 pages in Chinese).

Korean Office Action issued on Nov. 24, 2021, in counterpart Korean Patent Application No. 10-2019-0127853 (7 pages in English and 5 pages in Korean).

Chinese Office Action Issued on Aug. 18, 2022, in counterpart Chinese Patent Application No. 202010316372.0 (6 Pages in English, 7 Pages in Chinese).

United States Office Action Issued on Feb. 24, 2023, in related U.S. Appl. No. 16/750,052 (10 Pages in English).

United States Office Action Issued on Feb. 21, 2024, in Counterpart U.S. Appl. No. 17/892,195 (7 Pages in English).

U.S. Office Action issued on Jul. 9, 2024, in related U.S. Appl. No. 17/892,195 (7 pages).

Chinese Office Action issued on Sep. 11, 2025, in counterpart Chinese Patent Application No. 202211522685.7. (3 pages in English, 6 pages in Chinese).

* cited by examiner

оптical imaging system including seven lenses of +−+−++− or +−+−−+− refractive powers

CROSS-REFERENCE TO RELATED APPLICATIONS

This application is a Continuation Application of U.S. patent application Ser. No. 16/750,052 filed on Jan. 23, 2020, now U.S. Pat. No. 11,860,342 issued on Jan. 2, 2024, which claims the benefit under 35 U.S.C. 119(a) of Korean Patent Application No. 10-2019-0127853 filed on Oct. 15, 2019, in the Korean Intellectual Property Office, the entire disclosures of which are incorporated herein by reference for all purposes.

BACKGROUND

1. Field

The present disclosure relates to an optical imaging system.

2. Description of the Background

Recently, mobile communications terminals have been provided with camera modules including an optical imaging system composed of a plurality of lenses, enabling video calling and image capturing.

In addition, as levels of functionality of cameras in such mobile communications terminals have gradually increased, the camera modules mounted in such mobile communications terminals have gradually been required to have higher levels of resolution.

Furthermore, since mobile communications terminals tend to be miniaturized, the camera modules mounted in mobile communications terminals may also be required to be slimmer.

Therefore, the development of an optical imaging system realizing compactness and a high level of resolution may be desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens, sequentially arranged from an object side, wherein TTL/(2*Img HT)<0.7, where a distance on an optical axis from an object-side surface of the first lens to an imaging plane of an image sensor is TTL, and half of a diagonal length of the imaging plane of the image sensor is Img HT, and Fno<1.9, where an F-number of the optical imaging system is Fno.

The difference v1-v2 may be between 25 and 45, where an Abbe number of the first lens is v1, and an Abbe number of the second lens is v2.

The difference v1-v3 may be less than 25, where an Abbe number of the third lens is v3.

The difference v1-v5 may be between 15 and 35, where an Abbe number of the fifth lens is v5.

The ratio f1/f may be less than 2.0, where a focal length of the first lens is f1, and an overall focal length of the optical imaging system is f.

The ratio f2/f may be between −10 and 0, where a focal length of the second lens is f2.

The ratio f3/f may be greater than 1.5, where a focal length of the third lens is f3.

The absolute value of the ratio f4/f may be greater than 3.0, where a focal length of the fourth lens is f4.

The ratio f2/f3 may be between −2.0 and 0.

The ratio f12/f may be between 1.0 and 1.5, where a synthetic focal length of the first lens and the second lens is f12.

The ratio TTL/f may be less than 1.4, and the ratio BFL/f may be less than 0.4, where a distance on the optical axis from an image-side surface of the seventh lens to the imaging plane of the image sensor is BFL.

The ratio D1/f may be less than 0.1, where a distance on the optical axis from an image-side surface of the first lens to an object-side surface of the second lens is D1.

The FOV may be less than 80°, where a field of view of the optical imaging system is FOV.

The first lens may have positive refractive power, the second lens may have negative refractive power, the third lens may have positive refractive power, the fourth lens may have negative refractive power, the fifth lens may have negative or positive refractive power, the sixth lens may have positive refractive power, and the seventh lens may have negative refractive power.

In another general aspect, an optical imaging system includes a first lens having positive refractive power, a second lens having negative refractive power, a third lens having positive refractive power, a fourth lens having negative refractive power, a fifth lens, a sixth lens, and a seventh lens, sequentially arranged from an object side, wherein TTL/(2*Img HT)<0.7, where a distance on an optical axis from an object-side surface of the first lens to an imaging plane of an image sensor is TTL, and half of a diagonal length of the imaging plane of the image sensor is Img HT, Fno<1.9, where an F-number of an optical imaging system is Fno, FOV<80°, where a field of view of the optical imaging system is FOV, and 15<v1-v5<35, where an Abbe number of the first lens is v1, and an Abbe number of the fifth lens is v5.

The first lens may have a convex object-side surface and a concave image-side surface, the second lens may have a convex object-side surface and a concave image-side surface, and the third lens may have a convex object-side surface.

The fifth lens may have a convex object-side surface and a concave image-side surface, the sixth lens may have positive refractive power, a convex object-side surface and a concave image-side surface, and the seventh lens may have negative refractive power, a concave object-side surface and a concave image-side surface.

A refractive index of one or more of the first to seventh lenses may be no less than 1.66.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
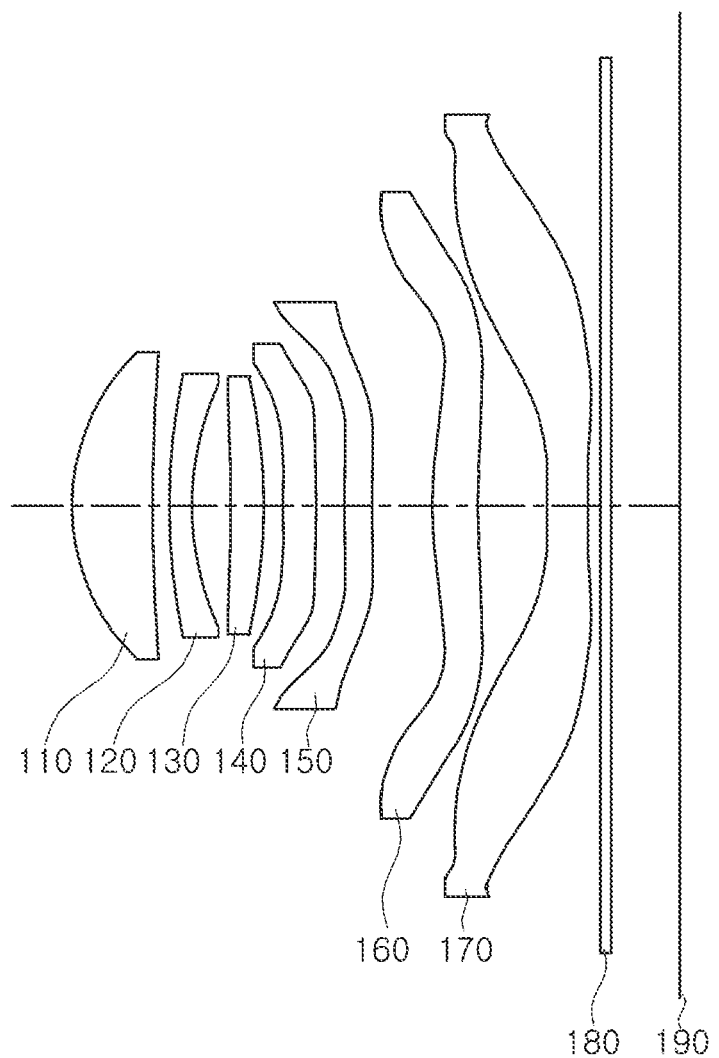
FIG. 1 is a view illustrating one or more examples of an optical imaging system according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

In the drawings, the thicknesses, sizes, and shapes of lenses may be somewhat exaggerated for convenience of explanation. In particular, the shapes of spherical surfaces or aspherical surfaces illustrated in the drawings are only illustrative. That is, the shapes of the spherical surfaces or the aspherical surfaces are not limited to those illustrated in the drawings.

In the present specification, a first lens refers to a lens closest to an object, while a seventh lens refers to a lens closest to an image sensor.

In addition, a first surface of each lens refers to a surface thereof closest to an object side (or an object-side surface)

and a second surface of each lens refers to a surface thereof closest to an image side (or an image-side surface). Further, in the present specification, all numerical values of radii of curvature, thicknesses, distances, focal lengths, and the like, of lenses are indicated by millimeters (mm), and a field of view (FOV) is indicated by degrees.

Further, in a description of a shape of each of the lenses, the meaning that one surface of a lens is convex is that a paraxial region portion of a corresponding surface is convex, the meaning that one surface of a lens is concave is that a paraxial region portion of a corresponding surface is concave, and the meaning that one surface of a lens is a plane is that a paraxial region portion of a corresponding surface is a plane. Therefore, although it is described that one surface of a lens is convex, an edge portion of the lens may be concave. Likewise, although it is described that one surface of a lens is concave, an edge portion of the lens may be convex. Moreover, although it is described that one surface of a lens is a plane, an edge portion of the lens may be convex or concave.

Meanwhile, a paraxial region refers to a narrow region including an optical axis.

One or more examples of the present disclosure may provide an optical imaging system capable of realizing high resolution, and having a small size.

One or more examples of an optical imaging system according to an embodiment of the present disclosure may include seven lenses.

For example, the optical imaging system according to an embodiment may include a first lens, a second lens, a third lens, a fourth lens, a fifth lens, a sixth lens, and a seventh lens, which are sequentially arranged from the object side. The first lens to the seventh lens may be respectively spaced apart from each other by a predetermined distance along the optical axis.

However, the optical imaging system according to an embodiment is not limited to only including seven lenses, but may further include other components, when necessary.

For example, the optical imaging system may further include an image sensor converting an image of a subject incident thereon into an electrical signal.

In addition, the optical imaging system may further include an infrared filter (hereinafter, referred to as a filter) filtering infrared light. The filter may be disposed between the seventh lens and the image sensor.

In addition, the optical imaging system may further include a stop controlling an amount of light.

In the optical imaging system according to an embodiment, the first to seventh lenses may be formed of plastic.

In addition, at least one of the first to seventh lenses may have an aspherical surface. Further, each of the first to seventh lenses may have at least one aspherical surface.

That is, at least one of first and second surfaces of all of the first to seventh lenses may be aspherical. Here, the aspherical surfaces of the first to seventh lenses may be represented by the following Equation 1:

$$Z = \frac{cY^2}{1+\sqrt{(1+K)c^2Y^2}} + AY^4 + BY^6 + CY^8 + DY^{10} + EY^{12} + FY^{14} + GY^{16} + HY^{18} + JY^{20} + KY^{22} + LY^{24} + MY^{26} + NY^{28} + OY^{30}$$ Equation 1

Here, c is a curvature (an inverse of a radius of curvature) of a lens, K is a conic constant, and Y is a distance from a certain point on an aspherical surface of the lens to an optical axis in a direction perpendicular to the optical axis. In addition, constants A to O are aspherical coefficients. In addition, Z is a distance from the certain point on the aspherical surface of the lens to a tangential plane meeting the apex of the aspherical surface of the lens.

The optical imaging system including the first to seventh lenses may have positive refractive power/negative refractive power/positive refractive power/negative refractive power/positive refractive power/positive refractive power/ negative refractive power sequentially from the object side. Alternatively, the first to seventh lenses may have positive refractive power/negative refractive power/positive refractive power/negative refractive power/negative refractive power/positive refractive power/negative refractive power.

The optical imaging system according to an exemplary embodiment may satisfy at least one of the following Conditional Expressions:

| | |
|---|---|
| $0 < f1/f < 2.0$ | Conditional Expression 1 |
| $25 < v1-v2 < 45$ | Conditional Expression 2 |
| $v1-v3 < 25$ | Conditional Expression 3 |
| $15 < v1-v5 < 35$ | Conditional Expression 4 |
| $-10.0 < f2/f < 0$ | Conditional Expression 5 |
| $f3/f > 1.5$ | Conditional Expression 6 |
| $|f4/f| > 3.0$ | Conditional Expression 7 |
| $f6/f > 0$ | Conditional Expression 8 |
| $f7/f < 0$ | Conditional Expression 9 |
| $TTL/f < 1.4$ | Conditional Expression 10 |
| $-2.0 < f2/f3 < 0$ | Conditional Expression 11 |
| $BFL/f < 0.4$ | Conditional Expression 12 |
| $D1/f < 0.1$ | Conditional Expression 13 |
| $FOV < 80°$ | Conditional Expression 14 |
| $Fno < 1.9$ | Conditional Expression 15 |
| $TTL/(2*Img\ HT) < 0.7$ | Conditional Expression 16 |
| $1.0 < f12/f < 1.5$ | Conditional Expression 17 |

Here, f is an overall focal length of an optical imaging system, f1 is a focal length of a first lens, f2 is a focal length of a second lens, f3 is a focal length of a third lens, f4 is a focal length of a fourth lens, f5 is a focal length of a fifth lens, f6 is a focal length of a sixth lens, f7 is a focal length of a seventh lens, and f12 is a synthetic focal length of the first lens and the second lens.

v1 is an Abbe number of the first lens, v2 is an Abbe number of the second lens, v3 is an Abbe number of the third lens, and v5 is an Abbe number of the fifth lens.

TTL is a distance from the object-side surface of the first lens to an imaging plane of an image sensor on the optical axis, BFL is a distance from the image-side surface of the seventh lens to the imaging plane of the image sensor on the optical axis, D1 is a distance between the image-side surface of the first lens and the object-side surface of the second lens on the optical axis, and Img HT is a half of a diagonal length of the imaging plane of the image sensor.

FOV is a field of view of the optical imaging system, and Fno is an F-number of the optical imaging system.

Next, examples of the first to seventh lenses constituting the optical imaging system according to an embodiment are described.

The first lens may have positive refractive power. In addition, the first lens may have a meniscus shape of which an object-side surface is convex. For example, a first surface of the first lens may be convex, and a second surface thereof may be concave.

At least one of the first and second surfaces of the first lens may be aspherical. For example, both surfaces of the first lens may be aspherical.

The second lens may have negative refractive power. In addition, the second lens may have a meniscus shape of which an object-side surface is convex. For example, a first surface of the second lens may be convex, and a second surface thereof may be concave.

At least one of the first and second surfaces of the second lens may be aspherical. For example, both surfaces of the second lens may be aspherical.

The third lens may have positive refractive power. In addition, the third lens may have a meniscus shape of which an object-side surface is convex. For example, a first surface of the third lens may be convex, and a second surface thereof may be concave.

Alternatively, both surfaces of the third lens may be convex. In detail, first and second surfaces of the third lens may be convex.

At least one of the first and second surfaces of the third lens may be aspherical. For example, both surfaces of the third lens may be aspherical.

The fourth lens may have negative refractive power. In addition, both surfaces of the fourth lens may be concave. In detail, first and second surfaces of the fourth lens may be concave.

Alternatively, the fourth lens may have a meniscus shape of which an object-side surface is convex. For example, a first surface of the fourth lens may be convex, and a second surface thereof may be concave.

At least one of the first and second surfaces of the fourth lens may be aspherical. For example, both surfaces of the fourth lens may be aspherical.

The fifth lens may have negative or positive refractive power. In addition, the fifth lens may have a meniscus shape of which an object-side surface is convex. For example, a first surface of the fifth lens may be convex in a paraxial region, and a second surface thereof may be concave in the paraxial region.

At least one of the first and second surfaces of the fifth lens may be aspherical. For example, both surfaces of the fifth lens may be aspherical.

At least one inflection point may be formed on at least one of the first and second surfaces of the fifth lens. For example, the first surface of the fifth lens may be convex in a paraxial region, and may be concave at an edge thereof. The second surface of the fifth lens may be concave in a paraxial region, and may be convex at an edge thereof.

The sixth lens may have positive refractive power. In addition, the sixth lens may have a meniscus shape of which an object-side surface is convex. For example, a first surface of the sixth lens may be convex in a paraxial region, and a second surface thereof may be concave in the paraxial region.

At least one of the first and second surfaces of the sixth lens may be aspherical. For example, both surfaces of the sixth lens may be aspherical.

At least one inflection point may be formed on at least one of the first and second surfaces of the sixth lens. For example, the first surface of the sixth lens may be convex in a paraxial region, and may be concave at an edge thereof. The second surface of the sixth lens may be concave in a paraxial region, and may be convex at an edge thereof.

The seventh lens may have negative refractive power. In addition, both surfaces of the seventh lens may be concave. In detail, first and second surfaces of the seventh lens may be concave in the paraxial region.

At least one of the first and second surfaces of the seventh lens may be aspherical. For example, both surfaces of the seventh lens may be aspherical.

In addition, at least one inflection point may be formed on at least one of the first and second surfaces of the seventh lens. For example, the first surface of the seventh lens may be concave in a paraxial region, and may be convex at an edge thereof. The second surface of the seventh lens may be concave in a paraxial region, and may be convex at an edge thereof.

The first lens and the second lens may be formed of plastic materials having different optical properties from each other, and the second lens and the third lens may be formed of plastic materials having different optical properties from each other.

Meanwhile, a refractive index of at least one among the first to seventh lenses may be 1.66 or more. For example, a refractive index of at least one among the first to seventh lenses may be 1.67 or more.

A refractive index of a lens having negative refractive power among the first to fourth lenses may be 1.66 or more. As an example, the second lens and the fourth lens have negative refractive power and refractive indices of the second lens and the fourth lens may be 1.66 or more.

One or more examples of an optical imaging system according to a first embodiment of the present disclosure are hereinafter described with reference to FIGS. 1 and 2.

The optical imaging system according to the first embodiment of the present disclosure may include a first lens 110, a second lens 120, a third lens 130, a fourth lens 140, a fifth lens 150, a sixth lens 160, and a seventh lens 170, and may further include a stop, a filter 180, and an image sensor 190.

Lens characteristics (radii of curvature, thicknesses of lenses or distances between the lenses, refractive indices, Abbe numbers, and focal lengths) of each lens are shown in Table 1.

TABLE 1

| Surface No. | Remark | Radius of Curvature | Thickness or Distance | Refractive Index | Abbe number | Focal Length |
|---|---|---|---|---|---|---|
| S1 | First Lens | 1.98 | 0.768 | 1.547 | 56.1 | 4.4897 |
| S2 | | 8.89 | 0.175 | | | |
| S3 | Second Lens | 6.08 | 0.225 | 1.680 | 19.2 | −10.6334 |
| S4 | | 3.25 | 0.389 | | | |

TABLE 1-continued

| Surface No. | Remark | Radius of Curvature | Thickness or Distance | Refractive Index | Abbe number | Focal Length |
|---|---|---|---|---|---|---|
| S5 | Third Lens | 15.69 | 0.315 | 1.547 | 56.1 | 36.6547 |
| S6 | | 71.89 | 0.206 | | | |
| S7 | Fourth Lens | −17.91 | 0.335 | 1.680 | 19.2 | −19.2755 |
| S8 | | 49.11 | 0.257 | | | |
| S9 | Fifth Lens | 6.92 | 0.290 | 1.621 | 26.0 | 20.2203 |
| S10 | | 15.17 | 0.569 | | | |
| S11 | Sixth Lens | 2.83 | 0.458 | 1.547 | 56.1 | 7.5233 |
| S12 | | 8.60 | 0.704 | | | |
| S13 | Seventh Lens | −5.50 | 0.390 | 1.547 | 56.1 | −3.9004 |
| S14 | | 3.57 | 0.123 | | | |
| S15 | Filter | Infinity | 0.110 | 1.519 | 64.2 | |
| S16 | | Infinity | 0.691 | | | |
| S17 | Imaging Plane | Infinity | | | | |

Meanwhile, according to the present example of the first embodiment, an overall focal length f of the optical imaging system is 5.4 mm, f12 is 6.6016 mm, Fno is 1.87, FOV is 78.7°, and Img HT is 4.54 mm.

Here, f12 is a synthetic focal length of the first and second lenses, Fno is the number representing brightness of an optical imaging system, FOV is a field of view of the optical imaging system, and Img HT if a half of a diagonal length of an imaging plane of an image sensor.

In the first embodiment, the first lens 110 may have positive refractive power, and a first surface thereof may be convex while a second surface thereof may be concave.

The second lens 120 may have negative refractive power, and a first surface thereof may be convex while a second surface thereof may be concave.

The third lens 130 may have positive refractive power, and a first surface thereof may be convex while a second surface thereof may be concave.

The fourth lens 140 may have negative refractive power, and the first and second surfaces thereof may be concave.

The fifth lens 150 may have positive refractive power, and a first surface thereof may be convex in a paraxial area while a second surface thereof may be concave in the paraxial area.

In addition, at least one inflection point may be formed on at least one of the first and second surfaces of the fifth lens 150. For example, the first surface of the fifth lens 150 may be convex in a paraxial region, and may be concave at an edge thereof. In addition, the second surface of the fifth lens 150 may be concave in a paraxial region, and may be convex at an edge thereof.

The sixth lens 160 may have positive refractive power, and a first surface thereof may be convex in a paraxial area while a second surface thereof may be concave in the paraxial area.

In addition, at least one inflection point may be formed on at least one of the first and second surfaces of the sixth lens 160. For example, the first surface of the sixth lens 160 may be convex in a paraxial region, and may be concave at an edge thereof. In addition, the second surface of the sixth lens 160 may be concave in a paraxial region, and may be convex at an edge thereof.

The seventh lens 170 may have negative refractive power, and the first and second surfaces thereof may be concave in a paraxial area.

In addition, at least one inflection point may be formed on at least one of the first and second surfaces of the seventh lens 170. For example, the first surface of the seventh lens 170 may be concave in a paraxial region, and may be convex at an edge thereof. In addition, the second surface of the seventh lens 170 may be concave in a paraxial region, and may be convex at an edge thereof.

Meanwhile, respective surfaces of the first to seventh lenses 110 to 170 may have aspherical coefficients as illustrated in Table 2. For example, all of object-side surfaces and image-side surfaces of the first to seventh lenses 110 to 170 may be aspherical.

TABLE 2

| | S1 | S2 | S3 | S4 | S5 | S6 | S7 |
|---|---|---|---|---|---|---|---|
| K | −1.06 | 19.72 | 16.39 | 2.36 | 0.00 | 33.68 | 0.00 |
| A | 0.01 | −0.04 | −0.07 | −0.07 | −0.06 | −0.06 | −0.10 |
| B | 0.01 | 0.12 | 0.01 | 0.12 | 0.05 | 0.02 | 0.29 |
| C | −0.02 | −0.68 | 0.27 | 0.03 | 0.15 | −0.24 | −2.04 |
| D | 0.12 | 2.95 | 0.34 | −3.07 | −4.78 | 1.82 | 9.74 |
| E | −0.63 | −8.79 | −8.23 | 24.14 | 34.85 | −9.05 | −31.65 |
| F | 2.00 | 18.13 | 36.48 | −102.50 | −140.21 | 29.95 | 71.86 |
| G | −3.98 | −26.46 | −89.72 | 275.47 | 363.75 | −66.99 | −116.13 |
| H | 5.22 | 27.68 | 142.53 | −497.74 | −645.50 | 103.44 | 135.03 |
| J | −4.66 | −20.80 | −153.67 | 620.42 | 801.54 | −111.53 | −113.18 |
| K | 2.85 | 11.12 | 113.87 | −535.55 | −696.97 | 83.82 | 67.75 |
| L | −1.18 | −4.12 | −57.20 | 314.72 | 416.06 | −43.04 | −28.25 |
| M | 0.31 | 1.00 | 18.63 | −120.25 | −162.45 | 14.40 | 7.80 |
| N | −0.05 | −0.14 | −3.55 | 26.95 | 37.36 | −2.83 | −1.28 |
| O | 0.00 | 0.01 | 0.30 | −2.69 | −3.84 | 0.25 | 0.09 |

| | S8 | S9 | S10 | S11 | S12 | S13 | S14 |
|---|---|---|---|---|---|---|---|
| K | 0.00 | 0.00 | −28.08 | −7.49 | −90.86 | −0.69 | −30.71 |
| A | −0.11 | −0.20 | −0.19 | −0.03 | 0.02 | −0.13 | −0.07 |
| B | 0.10 | 0.31 | 0.25 | −0.01 | −0.06 | 0.08 | 0.03 |
| C | 0.07 | −0.73 | −0.44 | 0.02 | 0.06 | −0.02 | 0.00 |
| D | −1.42 | 1.65 | 0.76 | −0.02 | −0.04 | 0.00 | −0.01 |
| E | 5.62 | −2.94 | −1.02 | 0.00 | 0.02 | 0.00 | 0.01 |
| F | −12.91 | 3.85 | 1.01 | 0.00 | −0.01 | 0.00 | 0.00 |
| G | 19.73 | −3.66 | −0.71 | 0.00 | 0.00 | 0.00 | 0.00 |
| H | −21.01 | 2.52 | 0.36 | 0.00 | 0.00 | 0.00 | 0.00 |
| J | 15.83 | −1.25 | −1.25 | 0.00 | 0.00 | 0.00 | 0.00 |
| K | −8.41 | 0.44 | 0.44 | 0.00 | 0.00 | 0.00 | 0.00 |
| L | 3.08 | −0.11 | −0.11 | 0.00 | 0.00 | 0.00 | 0.00 |
| M | −0.74 | 0.02 | 0.02 | 0.00 | 0.00 | 0.00 | 0.00 |
| N | 0.10 | 0.00 | 0.00 | 0.00 | 0.00 | 0.00 | 0.00 |
| O | −0.01 | 0.00 | 0.00 | 0.00 | 0.00 | 0.00 | 0.00 |

Figure 2:
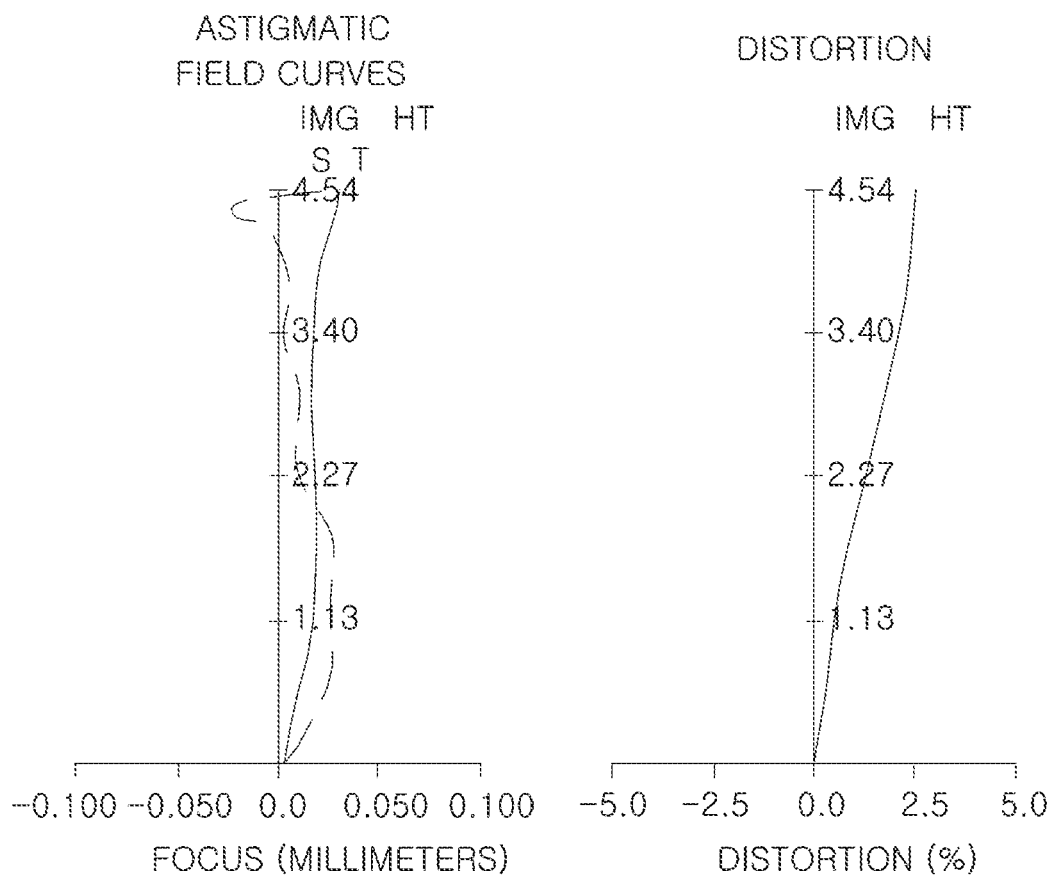
FIG. 2 presents graphs representing aberration characteristics of the optical imaging system illustrated in FIG. 1.

In addition, the imaging optical system configured as described above may have the aberration characteristics illustrated in FIG. 2.

Figure 3:
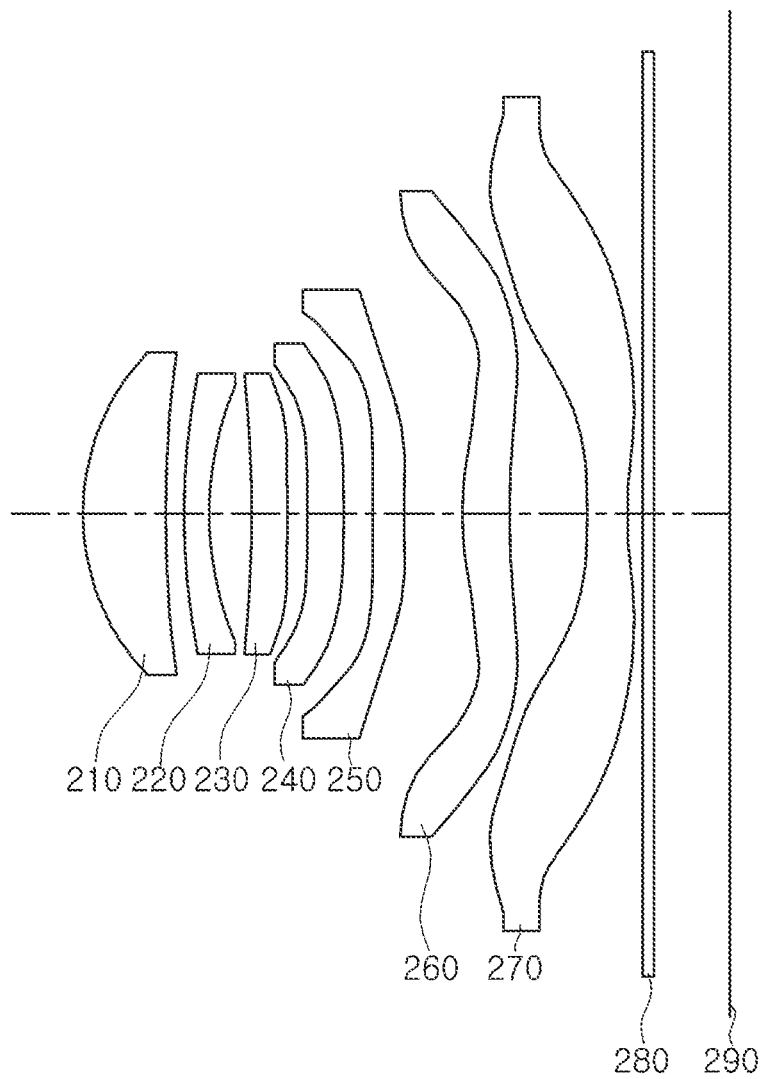
FIG. 3 is a view illustrating one or more examples of an optical imaging system according to a second embodiment of the present disclosure.

One or more examples of an optical imaging system according to a second embodiment of the present disclosure are hereinafter described with reference to FIGS. 3 and 4.

The optical imaging system according to the second embodiment of the present disclosure may include a first lens 210, a second lens 220, a third lens 230, a fourth lens 240, a fifth lens 250, a sixth lens 260, and a seventh lens 270, and may further include a stop, a filter 280, and an image sensor 290.

Lens characteristics (radii of curvature, thicknesses of lenses or distances between the lenses, refractive indices, Abbe numbers, and focal lengths) of each lens are shown in Table 3.

TABLE 3

| Surface No. | Remark | Radius of Curvature | Thickness or Distance | Refractive Index | Abbe number | Focal Length |
|---|---|---|---|---|---|---|
| S1 | First Lens | 1.99 | 0.778 | 1.547 | 56.1 | 4.5274 |
| S2 | | 8.76 | 0.171 | | | |
| S3 | Second Lens | 6.26 | 0.225 | 1.680 | 19.2 | −10.9616 |
| S4 | | 3.35 | 0.396 | | | |
| S5 | Third Lens | 22.08 | 0.338 | 1.547 | 56.1 | 35.9847 |
| S6 | | −178.81 | 0.191 | | | |
| S7 | Fourth Lens | −18.04 | 0.326 | 1.680 | 19.2 | −21.1484 |
| S8 | | 71.21 | 0.265 | | | |
| S9 | Fifth Lens | 8.02 | 0.290 | 1.621 | 26.0 | 26.5633 |
| S10 | | 15.41 | 0.547 | | | |
| S11 | Sixth Lens | 2.81 | 0.443 | 1.547 | 56.1 | 6.7139 |
| S12 | | 11.26 | 0.711 | | | |
| S13 | Seventh Lens | −4.98 | 0.390 | 1.547 | 56.1 | −3.7533 |
| S14 | | 3.58 | 0.129 | | | |
| S15 | Filter | Infinity | 0.110 | 1.519 | 64.2 | |
| S16 | | Infinity | 0.691 | | | |
| S17 | Imaging Plane | Infinity | | | | |

Meanwhile, according to the present example of the second embodiment, an overall focal length f of the optical imaging system is 5.4 mm, f12 is 6.592 mm, Fno is 1.86, FOV is 78.7°, and Img HT is 4.54 mm.

Here, f12, Fno, FOV, and Img HT are defined the same as in the first embodiment.

In the second embodiment, the first lens 210 may have positive refractive power, and a first surface thereof may be convex while a second surface thereof may be concave.

The second lens 220 may have negative refractive power, and a first surface thereof may be convex while a second surface thereof may be concave.

The third lens 230 may have positive refractive power, and the first and second surfaces thereof may be convex.

The fourth lens 240 may have negative refractive power, and the first and second surfaces thereof may be concave.

The fifth lens 250 may have positive refractive power, and a first surface thereof may be convex in a paraxial area while a second surface thereof may be concave in the paraxial area.

In addition, at least one inflection point may be formed on at least one of the first and second surfaces of the fifth lens 250. For example, the first surface of the fifth lens 250 may be convex in a paraxial region, and may be concave at an edge thereof. In addition, the second surface of the fifth lens 250 may be concave in a paraxial region, and may be convex at an edge thereof.

The sixth lens 260 may have positive refractive power, and a first surface thereof may be convex in a paraxial area while a second surface thereof may be concave in the paraxial area.

In addition, at least one inflection point may be formed on at least one of the first and second surfaces of the sixth lens 260. For example, the first surface of the sixth lens 260 may be convex in a paraxial region, and may be concave at an edge thereof. In addition, the second surface of the sixth lens 260 may be concave in a paraxial region, and may be convex at an edge thereof.

The seventh lens 270 may have negative refractive power, and the first and second surfaces thereof may be concave in a paraxial area.

In addition, at least one inflection point may be formed on at least one of the first and second surfaces of the seventh lens 270. For example, the first surface of the seventh lens 270 may be concave in a paraxial region, and may be convex at an edge thereof. The second surface of the seventh lens 270 may be concave in a paraxial region, and may be convex at an edge thereof.

Meanwhile, respective surfaces of the first to seventh lenses 210 to 270 may have aspherical coefficients as illustrated in Table 4. For example, all of object-side surfaces and image-side surfaces of the first to seventh lenses 210 to 270 may be aspherical.

TABLE 4

| | S1 | S2 | S3 | S4 | S5 | S6 | S7 |
|---|---|---|---|---|---|---|---|
| K | −1.01 | 20.32 | 16.47 | 2.09 | 0.00 | 74.55 | 0.00 |
| A | 0.00 | −0.05 | −0.08 | −0.10 | −0.02 | −0.08 | −0.08 |
| B | 0.17 | 0.26 | 0.09 | 0.63 | −0.47 | 0.29 | 0.14 |
| C | −0.98 | −1.73 | −0.24 | −5.45 | 4.83 | −2.44 | −1.01 |
| D | 3.67 | 7.86 | 1.97 | 33.66 | −31.25 | 12.92 | 4.73 |
| E | −9.41 | −23.90 | −10.19 | −139.72 | 133.64 | −45.61 | −15.11 |
| F | 17.06 | 50.25 | 32.28 | 403.66 | −392.79 | 111.96 | 33.88 |
| G | −22.30 | −75.07 | −67.51 | −833.27 | 814.85 | −195.48 | −54.19 |
| H | 21.25 | 80.82 | 97.06 | 1245.90 | −1211.16 | 245.42 | 62.47 |
| J | −14.74 | −62.90 | −97.51 | −1351.83 | 1294.55 | −221.83 | −52.07 |
| K | 7.36 | 35.06 | 68.38 | 1053.30 | −986.34 | 142.90 | 31.14 |
| L | −2.57 | −13.64 | −32.80 | −573.90 | 522.45 | −63.94 | −13.05 |

TABLE 4-continued

|   | | | | | | | |
|---|---|---|---|---|---|---|---|
| M | 0.60 | 3.52 | 10.26 | 207.43 | −182.73 | 18.87 | 3.65 |
| N | −0.08 | −0.54 | −1.89 | −44.65 | 37.92 | −3.30 | −0.61 |
| O | 0.01 | 0.04 | 0.15 | 4.33 | −3.54 | 0.26 | 0.05 |

|   | S8 | S9 | S10 | S11 | S12 | S13 | S14 |
|---|---|---|---|---|---|---|---|
| K | 0.00 | 0.00 | −23.48 | −8.45 | −92.11 | −1.83 | −27.15 |
| A | −0.09 | −0.17 | −0.18 | 0.00 | 0.05 | −0.10 | −0.06 |
| B | 0.02 | 0.18 | 0.18 | −0.05 | −0.08 | 0.03 | 0.00 |
| C | 0.27 | −0.28 | −0.24 | 0.04 | 0.06 | 0.01 | 0.02 |
| D | −1.79 | 0.50 | 0.38 | −0.01 | −0.02 | −0.01 | −0.02 |
| E | 5.89 | −0.84 | −0.52 | 0.00 | 0.00 | 0.00 | 0.01 |
| F | −12.49 | 1.10 | 0.52 | 0.01 | 0.00 | 0.00 | 0.00 |
| G | 18.25 | −1.04 | −0.36 | 0.00 | 0.00 | 0.00 | 0.00 |
| H | −18.86 | 0.71 | 0.18 | 0.00 | 0.00 | 0.00 | 0.00 |
| J | 13.91 | −0.35 | −0.06 | 0.00 | 0.00 | 0.00 | 0.00 |
| K | −7.26 | 0.12 | 0.01 | 0.00 | 0.00 | 0.00 | 0.00 |
| L | 2.62 | −0.03 | 0.00 | 0.00 | 0.00 | 0.00 | 0.00 |
| M | −0.62 | 0.00 | 0.00 | 0.00 | 0.00 | 0.00 | 0.00 |
| N | 0.09 | 0.00 | 0.00 | 0.00 | 0.00 | 0.00 | 0.00 |
| O | −0.01 | 0.00 | 0.00 | 0.00 | 0.00 | 0.00 | 0.00 |

Figure 4:
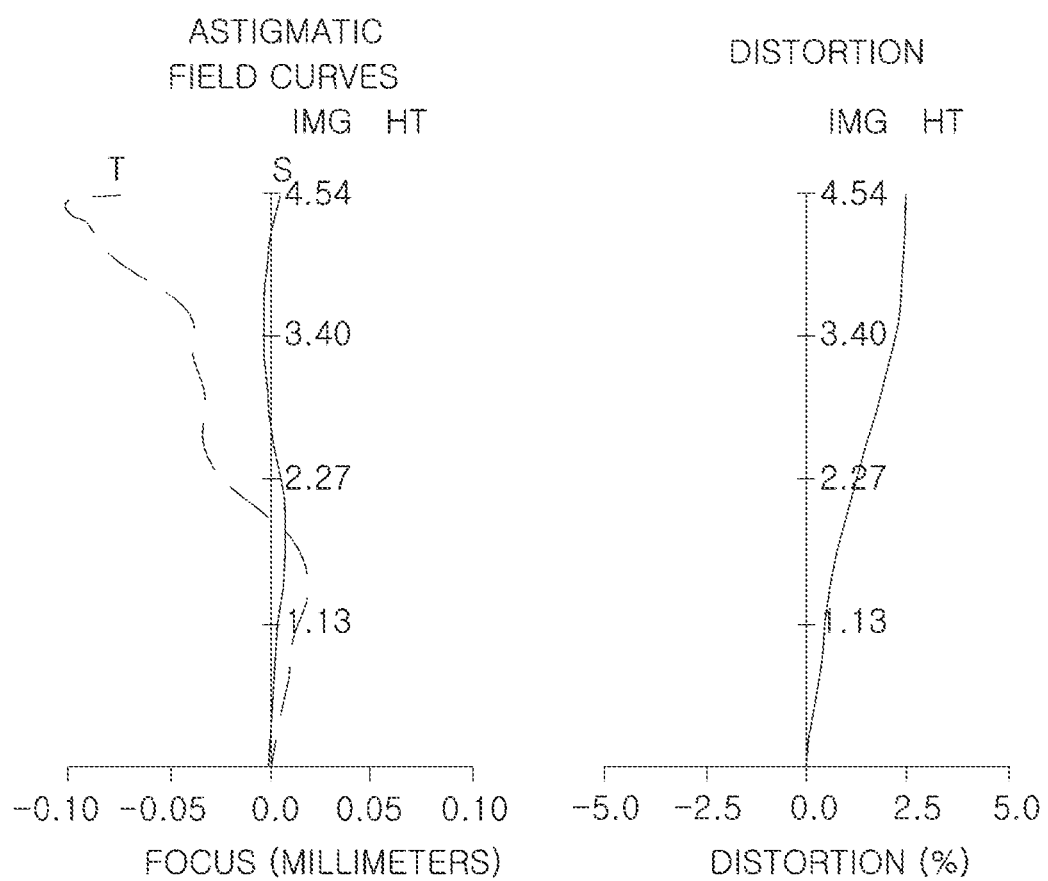
FIG. 4 presents graphs representing aberration characteristics of the optical imaging system illustrated in FIG. 3.

In addition, the imaging optical system configured as described above may have the aberration characteristics illustrated in FIG. 4.

Figure 5:
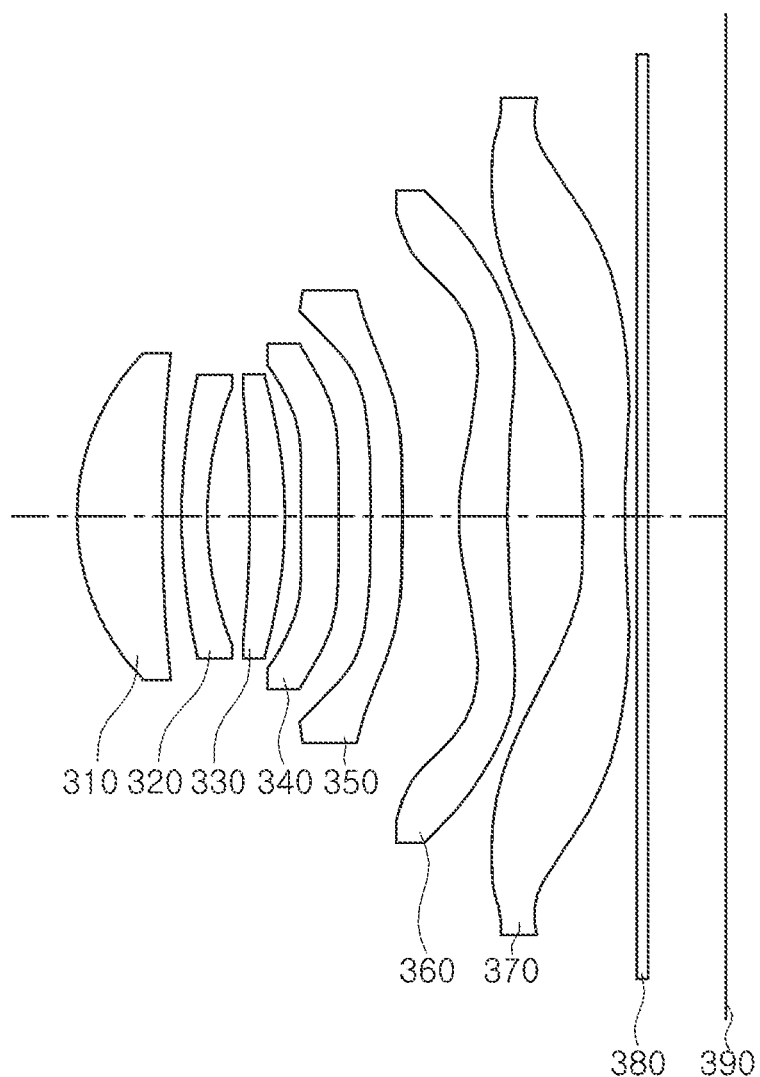
FIG. 5 is a view illustrating one or more examples of an optical imaging system according to a third embodiment of the present disclosure.

One or more examples of an optical imaging system according to a third embodiment of the present disclosure are hereinafter described with reference to FIGS. 5 and 6.

The optical imaging system according to the third embodiment of the present disclosure may include a first lens 310, a second lens 320, a third lens 330, a fourth lens 340, a fifth lens 350, a sixth lens 360, and a seventh lens 370, and may further include a stop, a filter 380, and an image sensor 390.

Lens characteristics (radii of curvature, thicknesses of lenses or distances between the lenses, refractive indices, Abbe numbers, and focal lengths) of each lens are shown in Table 5.

TABLE 5

| Surface No. | Remark | Radius of Curvature | Thickness or Distance | Refractive Index | Abbe number | Focal Length |
|---|---|---|---|---|---|---|
| S1 | First Lens | 1.99 | 0.774 | 1.547 | 56.1 | 4.5239 |
| S2 | | 8.84 | 0.178 | | | |
| S3 | Second Lens | 6.27 | 0.225 | 1.680 | 19.2 | −10.8704 |
| S4 | | 3.34 | 0.390 | | | |
| S5 | Third Lens | 19.34 | 0.324 | 1.547 | 56.1 | 34.7582 |
| S6 | | −1047.67 | 0.188 | | | |
| S7 | Fourth Lens | −16.32 | 0.345 | 1.680 | 19.2 | −20.5053 |
| S8 | | 96.08 | 0.272 | | | |
| S9 | Fifth Lens | 7.95 | 0.290 | 1.621 | 26.0 | 25.4679 |
| S10 | | 15.76 | 0.558 | | | |
| S11 | Sixth Lens | 2.76 | 0.436 | 1.547 | 56.1 | 6.7249 |
| S12 | | 10.50 | 0.713 | | | |
| S13 | Seventh Lens | −4.97 | 0.380 | 1.547 | 56.1 | −3.7462 |
| S14 | | 3.58 | 0.053 | | | |
| S15 | Filter | Infinity | 0.110 | 1.519 | 64.2 | |
| S16 | | Infinity | 0.766 | | | |
| S17 | Imaging Plane | Infinity | | | | |

Meanwhile, according to the present example of the third embodiment, an overall focal length f of the optical imaging system is 4.785 mm, f12 is 6.608 mm, Fno is 1.86, FOV is 78.7°, and Img HT is 4.54 mm.

Here, f12, Fno, FOV, and Img HT are defined the same as in the first embodiment.

In the third embodiment, the first lens 310 may have positive refractive power, and a first surface thereof may be convex while a second surface thereof may be concave.

The second lens 320 may have negative refractive power, and a first surface thereof may be convex while a second surface thereof may be concave.

The third lens 330 may have positive refractive power, and the first and second surfaces thereof are convex.

The fourth lens 340 may have negative refractive power, and the first and second surfaces thereof may be concave in a paraxial area.

The fifth lens 350 may have positive refractive power, and a first surface thereof may be convex in a paraxial area while a second surface thereof may be concave in the paraxial area.

In addition, at least one inflection point may be formed on at least one of the first and second surfaces of the fifth lens 350. For example, the first surface of the fifth lens 350 may be convex in a paraxial region, and may be concave at an edge thereof. The second surface of the fifth lens 350 may be concave in a paraxial region, and may be convex at an edge thereof.

The sixth lens 360 may have positive refractive power, and a first surface thereof may be convex in a paraxial area while a second surface thereof may be concave in the paraxial area.

In addition, at least one inflection point may be formed on at least one of the first and second surfaces of the sixth lens 360. For example, the first surface of the sixth lens 360 may be convex in a paraxial region, and may be concave at an edge thereof. The second surface of the sixth lens 360 may be concave in a paraxial region, and may be convex at an edge thereof.

The seventh lens 370 may have negative refractive power, and the first and second surfaces thereof may be concave in a paraxial area.

In addition, at least one inflection point may be formed on at least one of the first and second surfaces of the seventh lens 370. For example, the first surface of the seventh lens 370 may be concave in a paraxial region, and may be convex at an edge thereof. The second surface of the seventh lens 370 may be concave in a paraxial region, and may be convex at an edge thereof.

Meanwhile, respective surfaces of the first to seventh lenses 310 to 370 may have aspherical coefficients as illustrated in Table 6. For example, all of object-side surfaces and image-side surfaces of the first to seventh lenses 310 to 370 may be aspherical.

TABLE 6

|   | S1 | S2 | S3 | S4 | S5 | S6 | S7 |
|---|---|---|---|---|---|---|---|
| K | −1.02 | 21.20 | 16.53 | 2.08 | 0.00 | 95.00 | 0.00 |
| A | 0.00 | −0.05 | −0.08 | −0.09 | −0.03 | −0.08 | −0.09 |
| B | 0.18 | 0.25 | 0.09 | 0.61 | −0.42 | 0.27 | 0.19 |
| C | −0.97 | −1.68 | −0.25 | −5.07 | 4.26 | −2.28 | −1.42 |
| D | 3.42 | 7.54 | 2.30 | 30.19 | −27.07 | 12.18 | 7.16 |
| E | −8.33 | −22.72 | −12.04 | −120.94 | 113.90 | −43.63 | −24.43 |
| F | 14.39 | 47.43 | 38.18 | 337.63 | −329.86 | 108.94 | 58.18 |
| G | −18.00 | −70.44 | −79.91 | −674.53 | 675.14 | −193.73 | −98.49 |
| H | 16.49 | 75.50 | 114.92 | 977.93 | −991.22 | 247.99 | 119.95 |
| J | −11.05 | −58.57 | −115.52 | −1031.15 | 1047.52 | −228.72 | −105.38 |
| K | 5.35 | 32.57 | 81.08 | 782.69 | −789.80 | 150.45 | 66.19 |
| L | −1.82 | −12.66 | −38.95 | −416.49 | 414.30 | −68.78 | −28.99 |
| M | 0.41 | 3.27 | 12.20 | 147.38 | −143.60 | 20.75 | 8.41 |

TABLE 6-continued

|   | | | | | | | |
|---|---|---|---|---|---|---|---|
| N | −0.06 | −0.50 | −2.25 | −31.13 | 29.55 | −3.71 | −1.45 |
| O | 0.00 | 0.03 | 0.18 | 2.97 | −2.73 | 0.30 | 0.11 |

|   | S8 | S9 | S10 | S11 | S12 | S13 | S14 |
|---|---|---|---|---|---|---|---|
| K | 0.00 | 0.00 | −20.74 | −8.58 | −94.63 | −1.66 | −25.77 |
| A | −0.10 | −0.17 | −0.18 | 0.00 | 0.05 | −0.10 | −0.06 |
| B | 0.12 | 0.19 | 0.17 | −0.06 | −0.09 | 0.03 | 0.01 |
| C | −0.33 | −0.33 | −0.23 | 0.05 | 0.06 | 0.01 | 0.02 |
| D | 0.59 | 0.67 | 0.37 | −0.01 | −0.02 | −0.01 | −0.01 |
| E | −0.47 | −1.19 | −0.50 | 0.00 | 0.00 | 0.00 | 0.01 |
| F | −0.68 | 1.55 | 0.50 | 0.01 | 0.00 | 0.00 | 0.00 |
| G | 2.62 | −1.46 | −0.34 | 0.00 | 0.00 | 0.00 | 0.00 |
| H | −3.95 | 0.99 | 0.17 | 0.00 | 0.00 | 0.00 | 0.00 |
| J | 3.63 | −0.48 | −0.06 | 0.00 | 0.00 | 0.00 | 0.00 |
| K | −2.20 | 0.17 | 0.01 | 0.00 | 0.00 | 0.00 | 0.00 |
| L | 0.89 | −0.04 | 0.00 | 0.00 | 0.00 | 0.00 | 0.00 |
| M | −0.23 | 0.01 | 0.00 | 0.00 | 0.00 | 0.00 | 0.00 |
| N | 0.03 | 0.00 | 0.00 | 0.00 | 0.00 | 0.00 | 0.00 |
| O | 0.00 | 0.00 | 0.00 | 0.00 | 0.00 | 0.00 | 0.00 |

Figure 6:
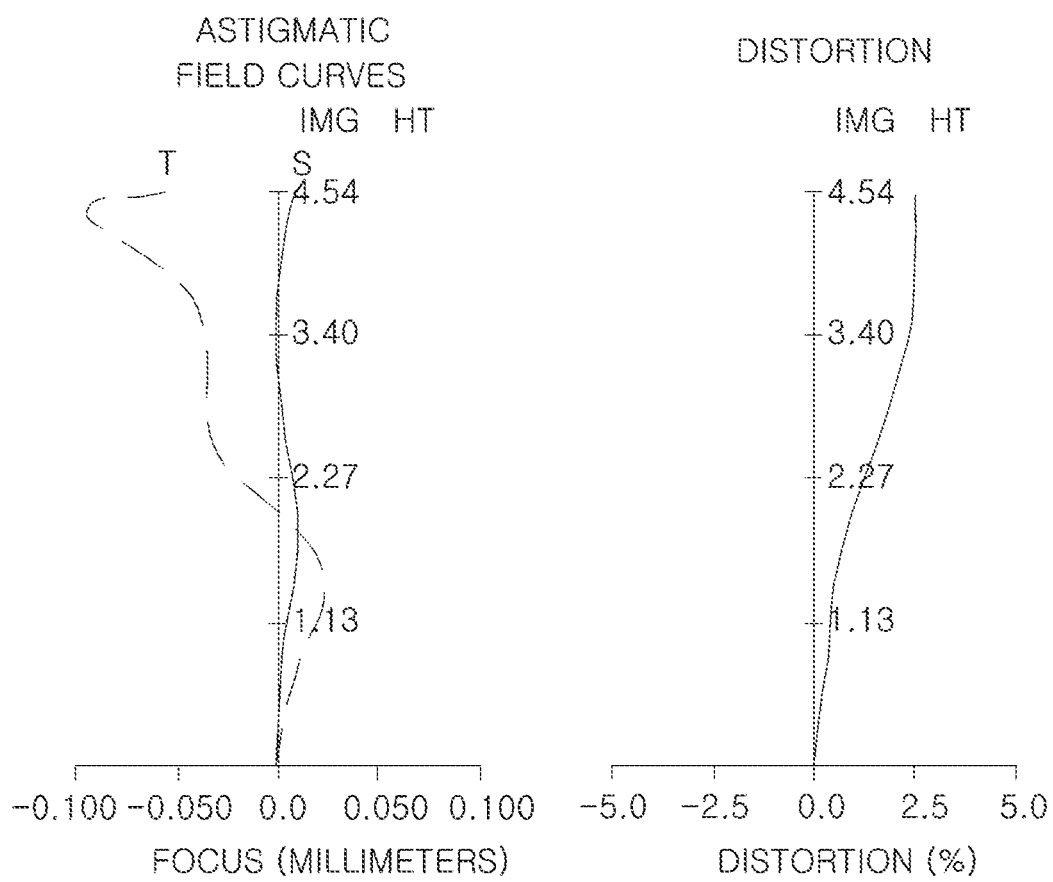
FIG. 6 presents graphs representing aberration characteristics of the optical imaging system illustrated in FIG. 5.

In addition, the imaging optical system configured as described above may have the aberration characteristics illustrated in FIG. 6.

Figure 7:
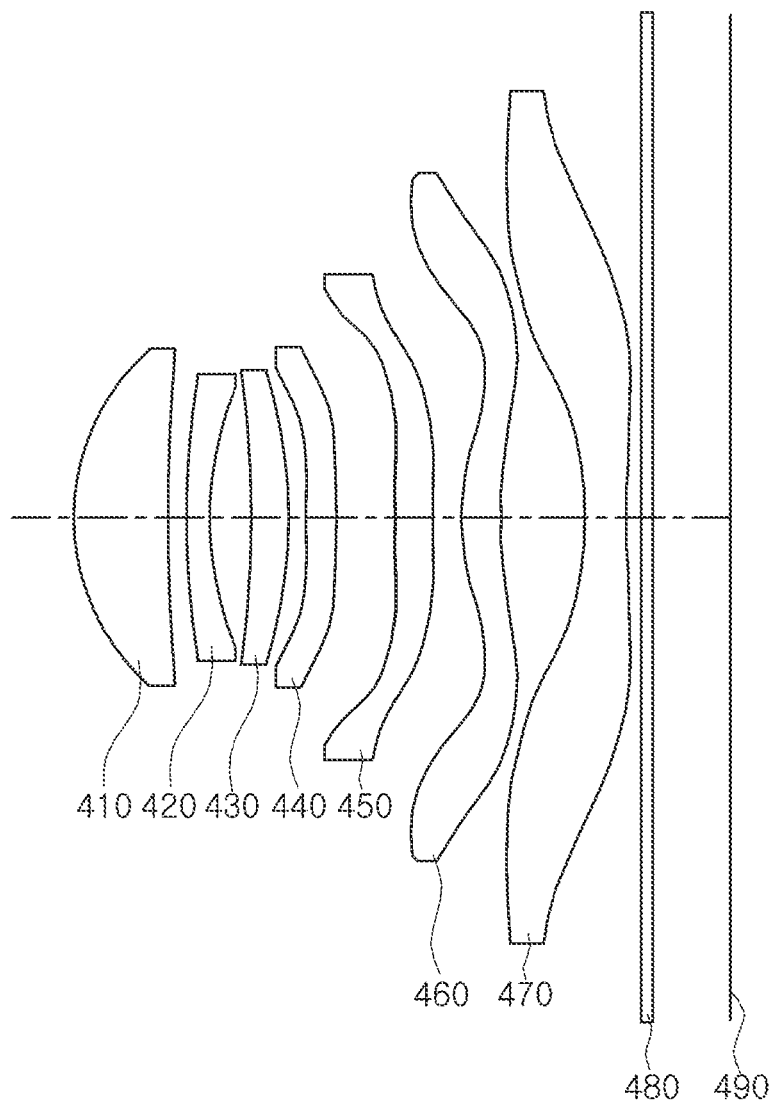
FIG. 7 is a view illustrating one or more examples of an optical imaging system according to a fourth embodiment of the present disclosure.

One or more examples of an optical imaging system according to a fourth embodiment of the present disclosure is hereinafter described with reference to FIGS. 7 and 8.

The optical imaging system according to the fourth embodiment of the present disclosure may include a first lens 410, a second lens 420, a third lens 430, a fourth lens 440, a fifth lens 450, a sixth lens 460, and a seventh lens 470, and may further include a stop, a filter 480, and an image sensor 490.

Lens characteristics (radii of curvature, thicknesses of lenses or distances between the lenses, refractive indices, Abbe numbers, and focal lengths) of each lens are shown in Table 7.

TABLE 7

| Surface No. | Remark | Radius of Curvature | Thickness or Distance | Refractive Index | Abbe number | Focal Length |
|---|---|---|---|---|---|---|
| S1 | First Lens | 2.05 | 0.841 | 1.547 | 56.1 | 4.6721 |
| S2 | | 8.84 | 0.165 | | | |
| S3 | Second Lens | 6.52 | 0.220 | 1.680 | 19.2 | −10.7590 |
| S4 | | 3.40 | 0.399 | | | |
| S5 | Third Lens | 18.15 | 0.343 | 1.547 | 56.1 | 43.7093 |
| S6 | | 75.13 | 0.166 | | | |
| S7 | Fourth Lens | −1125.42 | 0.286 | 1.669 | 20.4 | −89.3217 |
| S8 | | 63.08 | 0.528 | | | |
| S9 | Fifth Lens | 5.94 | 0.330 | 1.571 | 37.4 | −24.0283 |
| S10 | | 4.06 | 0.292 | | | |
| S11 | Sixth Lens | 1.85 | 0.370 | 1.547 | 56.1 | 4.6942 |
| S12 | | 6.20 | 0.768 | | | |
| S13 | Seventh Lens | −5.71 | 0.381 | 1.547 | 56.1 | −3.6398 |
| S14 | | 3.12 | 0.131 | | | |
| S15 | Filter | Infinity | 0.110 | 1.519 | 64.2 | |
| S16 | | Infinity | 0.670 | | | |
| S17 | Imaging Plane | Infinity | | | | |

Meanwhile, according to the present example of the fourth embodiment, an overall focal length f of the optical imaging system is 5.35 mm, f12 is 6.9706 mm, Fno is 1.79, FOV is 78.7°, and Img HT is 4.54 mm.

Here, f12, Fno, FOV, and Img HT are defined the same as in the first embodiment.

In the fourth embodiment, the first lens 410 may have positive refractive power, and a first surface thereof may be convex while a second surface thereof may be concave.

The second lens 420 may have negative refractive power, and a first surface thereof may be convex while a second surface thereof may be concave.

The third lens 430 may have positive refractive power, and a first surface thereof may be convex while a second surface thereof may be concave.

The fourth lens 440 may have negative refractive power, and the first and second surfaces thereof may be concave.

The fifth lens 450 may have negative refractive power, and a first surface thereof may be convex in a paraxial area while a second surface thereof may be concave in the paraxial area.

In addition, at least one inflection point may be formed on at least one of the first and second surfaces of the fifth lens 450. For example, the first surface of the fifth lens 450 may be convex in a paraxial region, and may be concave at an edge thereof. The second surface of the fifth lens 450 may be concave in a paraxial region, and may be convex at an edge thereof.

The sixth lens 460 may have positive refractive power, and a first surface thereof may be convex in a paraxial area while a second surface thereof may be concave in the paraxial area.

In addition, at least one inflection point may be formed on at least one of the first and second surfaces of the sixth lens 460. For example, the first surface of the sixth lens 460 may be convex in a paraxial region, and may be concave at an edge thereof. The second surface of the sixth lens 460 may be concave in a paraxial region, and may be convex at an edge thereof.

The seventh lens 470 may have negative refractive power, and the first and second surfaces thereof may be concave in a paraxial area.

In addition, at least one inflection point may be formed on at least one of the first and second surfaces of the seventh lens 470. For example, the first surface of the seventh lens 470 may be concave in a paraxial region, and may be convex at an edge thereof. The second surface of the seventh lens 470 may be concave in a paraxial region, and may be convex at an edge thereof.

Meanwhile, respective surfaces of the first to seventh lenses 410 to 470 may have aspherical coefficients as illustrated in Table 8. For example, all of object-side surfaces and image-side surfaces of the first to seventh lenses 410 to 470 may be aspherical.

TABLE 8

| | S1 | S2 | S3 | S4 | S5 | S6 | S7 |
|---|---|---|---|---|---|---|---|
| K | −1.06 | 19.90 | 16.01 | 1.68 | 0.00 | −95.00 | 0.00 |
| A | 0.00 | 0.00 | −0.14 | −0.14 | 0.00 | −0.11 | −0.02 |
| B | 0.07 | −0.39 | 0.67 | 1.21 | −0.73 | 0.49 | −0.97 |
| C | −0.27 | 2.39 | −4.28 | −10.28 | 6.52 | −2.87 | 7.23 |
| D | 0.74 | −8.67 | 19.66 | 58.76 | −36.62 | 11.17 | −32.52 |
| E | −1.58 | 21.02 | −61.12 | −225.35 | 137.17 | −29.77 | 96.86 |
| F | 2.56 | −35.60 | 132.71 | 602.62 | −356.57 | 55.57 | −200.92 |
| G | −3.11 | 43.16 | −206.12 | −1152.97 | 659.52 | −73.28 | 298.37 |
| H | 2.80 | −37.91 | 231.85 | 1599.06 | −879.40 | 68.18 | −321.49 |
| J | −1.84 | 24.16 | −189.10 | −1610.29 | 847.09 | −44.01 | 251.76 |
| K | 0.87 | −11.04 | 110.66 | 1165.18 | −583.69 | 18.90 | −141.79 |
| L | −0.29 | 3.53 | −45.24 | −590.00 | 280.36 | −4.88 | 55.94 |
| M | 0.06 | −0.75 | 12.26 | 198.35 | −89.11 | 0.54 | −14.67 |
| N | −0.01 | 0.09 | −1.98 | −39.75 | 16.84 | 0.04 | 2.30 |
| O | 0.00 | −0.01 | 0.14 | 3.59 | −1.43 | −0.01 | −0.16 |

| | S8 | S9 | S10 | S11 | S12 | S13 | S14 |
|---|---|---|---|---|---|---|---|
| K | 0.00 | 0.00 | −97.16 | −7.60 | −17.35 | −2.18 | −26.40 |
| A | −0.06 | −0.18 | −0.18 | 0.03 | 0.10 | −0.15 | −0.08 |
| B | −0.16 | 0.25 | 0.10 | −0.12 | −0.17 | 0.09 | 0.04 |
| C | 1.10 | −0.33 | 0.03 | 0.15 | 0.19 | −0.03 | 0.00 |
| D | −3.97 | 0.43 | −0.13 | −0.13 | −0.15 | 0.00 | 0.00 |
| E | 9.30 | −0.52 | 0.13 | 0.07 | 0.08 | 0.00 | 0.00 |
| F | −15.11 | 0.55 | −0.08 | −0.02 | −0.03 | 0.00 | 0.00 |
| G | 17.62 | −0.43 | 0.03 | 0.01 | 0.01 | 0.00 | 0.00 |
| H | −14.98 | 0.24 | −0.01 | 0.00 | 0.00 | 0.00 | 0.00 |
| J | 9.30 | −0.10 | 0.00 | 0.00 | 0.00 | 0.00 | 0.00 |
| K | −4.17 | 0.03 | 0.00 | 0.00 | 0.00 | 0.00 | 0.00 |
| L | 1.32 | −0.01 | 0.00 | 0.00 | 0.00 | 0.00 | 0.00 |
| M | −0.28 | 0.00 | 0.00 | 0.00 | 0.00 | 0.00 | 0.00 |
| N | 0.04 | 0.00 | 0.00 | 0.00 | 0.00 | 0.00 | 0.00 |
| O | 0.00 | 0.00 | 0.00 | 0.00 | 0.00 | 0.00 | 0.00 |

Figure 8:
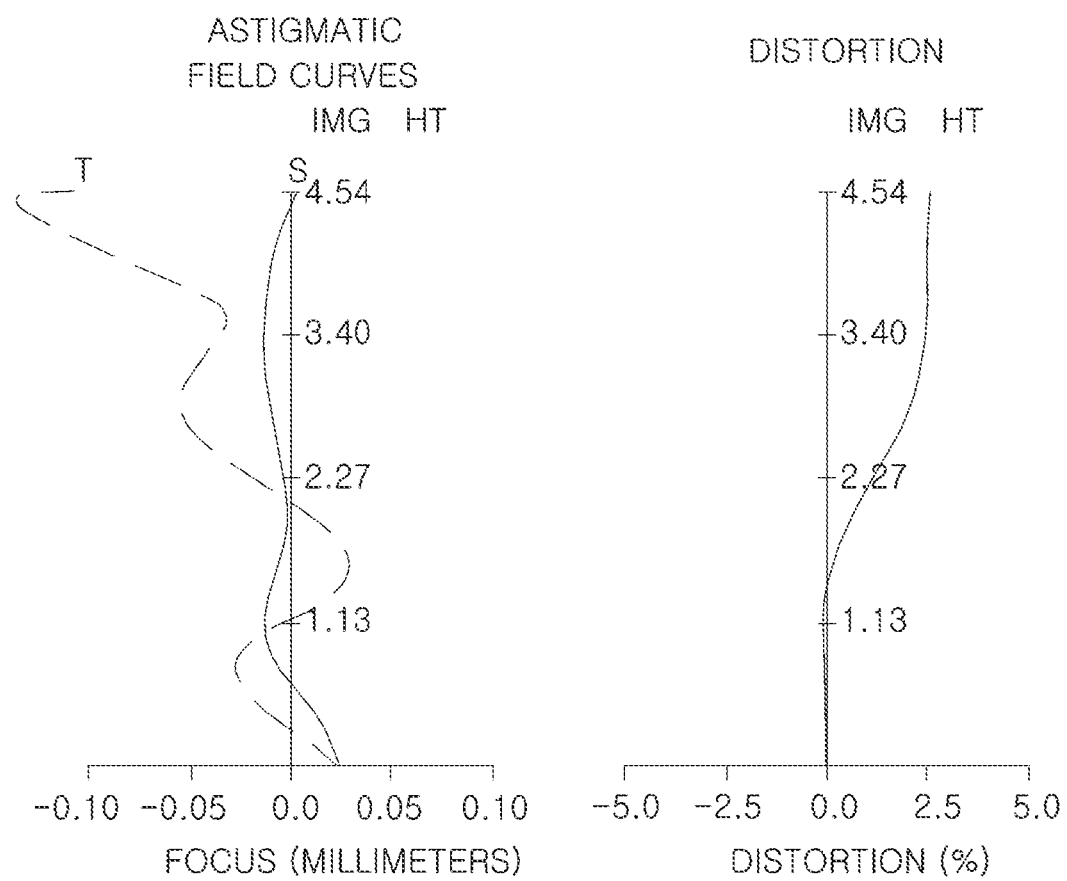
FIG. 8 presents graphs representing aberration characteristics of the optical imaging system illustrated in FIG. 7.

In addition, the imaging optical system configured as described above may have the aberration characteristics illustrated in FIG. 8.

Figure 9:
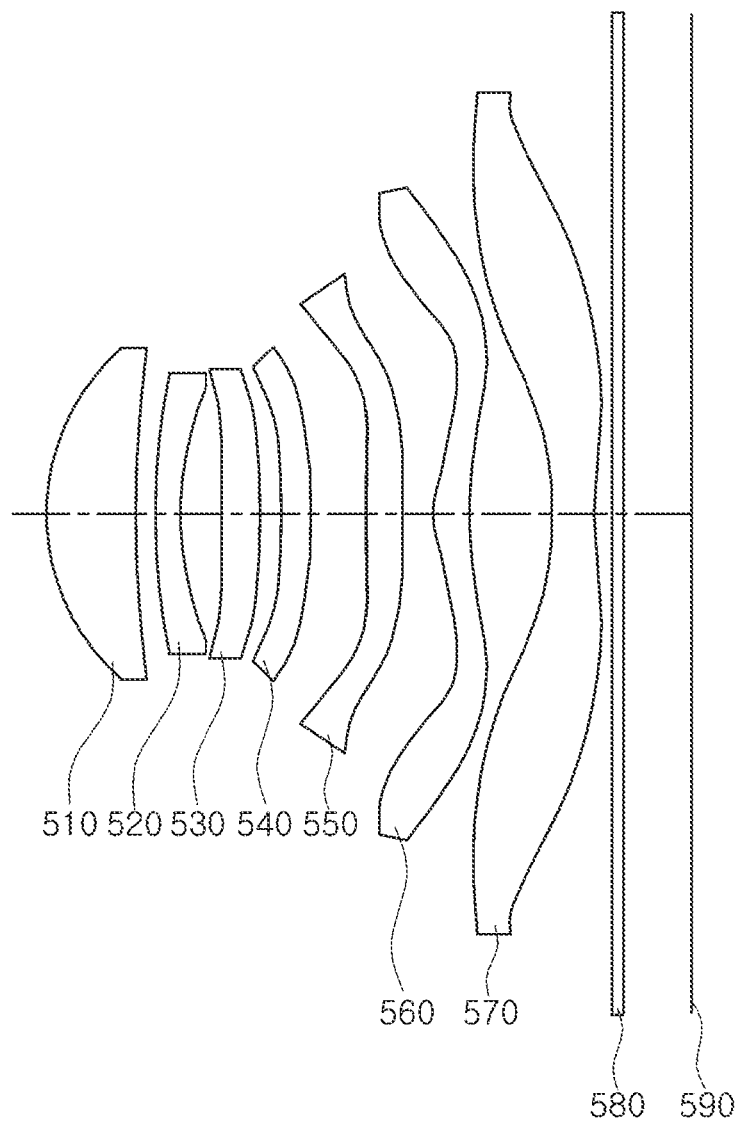
FIG. 9 is a view illustrating one or more examples of an optical imaging system according to a fifth embodiment of the present disclosure.

One or more examples of an optical imaging system according to a fifth embodiment of the present disclosure are hereinafter described with reference to FIGS. 9 and 10.

The optical imaging system according to the fifth embodiment of the present disclosure may include a first lens 510, a second lens 520, a third lens 530, a fourth lens 540, a fifth lens 550, a sixth lens 560, and a seventh lens 570, and may further include a stop, a filter 580, and an image sensor 590.

Lens characteristics (radii of curvature, thicknesses of lenses or distances between the lenses, refractive indices, Abbe numbers, and focal lengths) of each lens are shown in Table 9.

TABLE 9

| Surface No. | Remark | Radius of Curvature | Thickness or Distance | Refractive Index | Abbe number | Focal Length |
|---|---|---|---|---|---|---|
| S1 | First Lens | 2.04 | 0.839 | 1.547 | 56.1 | 4.6439 |
| S2 | | 8.77 | 0.168 | | | |
| S3 | Second Lens | 6.60 | 0.220 | 1.680 | 19.2 | −10.4084 |
| S4 | | 3.37 | 0.397 | | | |
| S5 | Third Lens | 14.78 | 0.354 | 1.547 | 56.1 | 36.8975 |
| S6 | | 54.84 | 0.177 | | | |
| S7 | Fourth Lens | 141.33 | 0.279 | 1.669 | 20.4 | −82.8101 |
| S8 | | 39.75 | 0.528 | | | |
| S9 | Fifth Lens | 5.46 | 0.325 | 1.571 | 37.4 | −25.0493 |
| S10 | | 3.87 | 0.304 | | | |

TABLE 9-continued

| Surface No. | Remark | Radius of Curvature | Thickness or Distance | Refractive Index | Abbe number | Focal Length |
|---|---|---|---|---|---|---|
| S11 | Sixth Lens | 1.86 | 0.332 | 1.547 | 56.1 | 4.7871 |
| S12 | | 6.00 | 0.778 | | | |
| S13 | Seventh Lens | −5.81 | 0.380 | 1.547 | 56.1 | −3.6128 |
| S14 | | 3.06 | 0.137 | | | |
| S15 | Filter | Infinity | 0.110 | 1.519 | 64.2 | |
| S16 | | Infinity | 0.641 | | | |
| S17 | Imaging Plane | Infinity | | | | |

Meanwhile, according to the present example of the fifth embodiment, an overall focal length f of the optical imaging system is 5.35 mm, f12 is 7.0122 mm, Fno is 1.79, FOV is 78.7°, and Img HT is 4.54 mm.

Here, f12, Fno, FOV, and Img HT are defined the same as in the first embodiment.

In the fifth embodiment, the first lens 510 may have positive refractive power, and a first surface thereof may be convex while a second surface thereof may be concave.

The second lens 520 may have negative refractive power, and a first surface thereof may be convex while a second surface thereof may be concave.

The third lens 530 may have positive refractive power, and a first surface thereof may be convex while a second surface thereof may be concave.

The fourth lens 540 may have negative refractive power, and a first surface thereof may be convex while a second surface thereof may be concave.

The fifth lens 550 may have negative refractive power, and a first surface thereof may be convex in a paraxial area while a second surface thereof may be concave in the paraxial area.

In addition, at least one inflection point may be formed on at least one of the first and second surfaces of the fifth lens 550. For example, the first surface of the fifth lens 550 may be convex in a paraxial region, and may be concave at an edge thereof. The second surface of the fifth lens 550 may be concave in a paraxial region, and may be convex at an edge thereof.

The sixth lens 560 may have positive refractive power, and a first surface thereof may be convex in a paraxial area while a second surface thereof may be concave in the paraxial area.

In addition, at least one inflection point may be formed on at least one of the first and second surfaces of the sixth lens 560. For example, the first surface of the sixth lens 560 may be convex in a paraxial region, and may be concave at an edge thereof. The second surface of the sixth lens 560 may be concave in a paraxial region, and may be convex at an edge thereof.

The seventh lens 570 may have negative refractive power, and the first and second surfaces thereof may be concave in a paraxial area.

In addition, at least one inflection point may be formed on at least one of the first and second surfaces of the seventh lens 570. For example, the first surface of the seventh lens 570 may be concave in a paraxial region, and may be convex at an edge thereof. The second surface of the seventh lens 570 may be concave in a paraxial region, and may be convex at an edge thereof.

Meanwhile, respective surfaces of the first to seventh lenses 510 to 570 may have aspherical coefficients as illustrated in Table 10. For example, all of object-side surfaces and image-side surfaces of the first to seventh lenses 510 to 570 may be aspherical.

TABLE 10

| | S1 | S2 | S3 | S4 | S5 | S6 | S7 |
|---|---|---|---|---|---|---|---|
| K | −1.06 | 19.74 | 16.19 | 1.76 | 0.00 | 49.72 | 0.00 |
| A | −0.02 | −0.02 | −0.12 | −0.12 | 0.01 | −0.11 | −0.03 |
| B | 0.27 | −0.18 | 0.51 | 0.84 | −0.95 | 0.64 | −0.85 |
| C | −1.27 | 1.36 | −3.31 | −6.98 | 8.53 | −4.70 | 6.55 |
| D | 3.86 | −5.60 | 16.26 | 40.30 | −47.54 | 22.18 | −29.72 |
| E | −8.01 | 15.19 | −53.72 | −156.30 | 175.59 | −70.51 | 88.86 |
| F | 11.82 | −28.66 | 123.06 | 422.44 | −449.03 | 155.93 | −184.71 |
| G | −12.65 | 38.62 | −200.34 | −816.74 | 816.52 | −245.30 | 274.70 |
| H | 9.91 | −37.61 | 234.85 | 1144.57 | −1070.42 | 277.95 | −296.22 |
| J | −5.68 | 26.50 | −198.60 | −1164.56 | 1014.16 | −227.34 | 231.95 |
| K | 2.35 | −13.38 | 119.95 | 851.25 | −687.71 | 132.92 | −130.49 |
| L | −0.69 | 4.71 | −50.41 | −435.30 | 325.30 | −54.16 | 51.36 |
| M | 0.13 | −1.10 | 13.99 | 147.73 | −101.90 | 14.60 | −13.42 |
| N | −0.02 | 0.15 | −2.31 | −29.87 | 18.99 | −2.34 | 2.09 |
| O | 0.00 | −0.01 | 0.17 | 2.72 | −1.59 | 0.17 | −0.15 |

| | S8 | S9 | S10 | S11 | S12 | S13 | S14 |
|---|---|---|---|---|---|---|---|
| K | 0.00 | 0.00 | −99.00 | −8.27 | −23.03 | −1.95 | −24.23 |
| A | −0.09 | −0.21 | −0.20 | 0.01 | 0.08 | −0.15 | −0.08 |
| B | −0.01 | 0.23 | 0.13 | −0.08 | −0.14 | 0.09 | 0.03 |
| C | 0.42 | −0.07 | 0.06 | 0.13 | 0.18 | −0.03 | 0.00 |
| D | −1.83 | −0.49 | −0.32 | −0.12 | −0.16 | 0.00 | 0.00 |
| E | 4.56 | 1.16 | 0.48 | 0.07 | 0.09 | 0.00 | 0.00 |
| F | −7.68 | −1.47 | −0.43 | −0.03 | −0.04 | 0.00 | 0.00 |
| G | 9.23 | 1.22 | 0.27 | 0.01 | 0.01 | 0.00 | 0.00 |

TABLE 10-continued

| | | | | | | |
|---|---|---|---|---|---|---|
| H | −8.07 | −0.72 | −0.11 | 0.00 | 0.00 | 0.00 | 0.00 |
| J | 5.16 | 0.30 | 0.04 | 0.00 | 0.00 | 0.00 | 0.00 |
| K | −2.38 | −0.09 | −0.01 | 0.00 | 0.00 | 0.00 | 0.00 |
| L | 0.77 | 0.02 | 0.00 | 0.00 | 0.00 | 0.00 | 0.00 |
| M | −0.17 | 0.00 | 0.00 | 0.00 | 0.00 | 0.00 | 0.00 |
| N | 0.02 | 0.00 | 0.00 | 0.00 | 0.00 | 0.00 | 0.00 |
| O | 0.00 | 0.00 | 0.00 | 0.00 | 0.00 | 0.00 | 0.00 |

Figure 10:
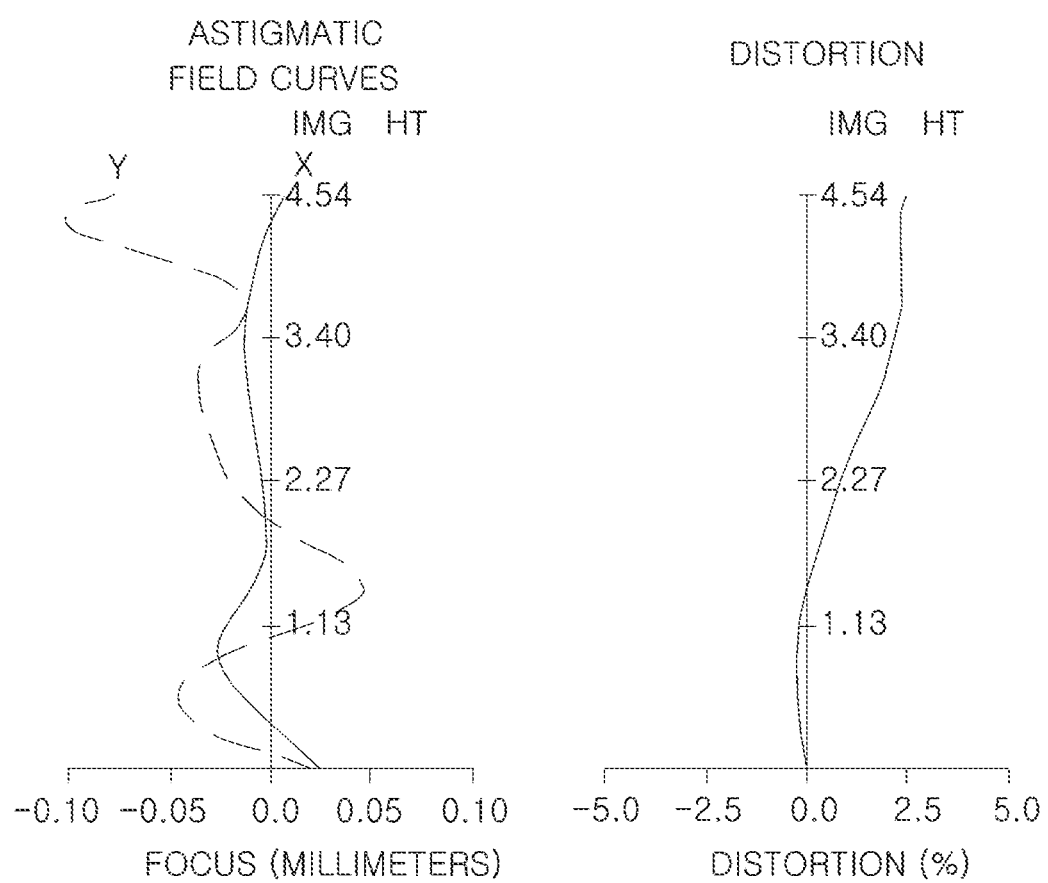
FIG. 10 presents graphs representing aberration characteristics of the optical imaging system illustrated in FIG. 9.

In addition, the imaging optical system configured as described above may have the aberration characteristics illustrated in FIG. 10.

Table 11 shows the conditional expression values of the imaging optical system according to the examples of each embodiment.

TABLE 11

| Conditional Expression | Embodiment 1 | Embodiment 2 | Embodiment 3 | Embodiment 4 | Embodiment 5 |
|---|---|---|---|---|---|
| f1/f | 0.8314 | 0.8384 | 0.9454 | 0.8733 | 0.8680 |
| v1 − v2 | 36.9 | 36.9 | 36.9 | 36.9 | 36.9 |
| v1 − v3 | 0 | 0 | 0 | 0 | 0 |
| v1 − v5 | 30.1 | 30.1 | 30.1 | 18.7 | 18.7 |
| f2/f | −1.9692 | −2.0299 | −2.2718 | −2.0110 | −1.9455 |
| f3/f | 6.7879 | 6.6638 | 7.2640 | 8.1700 | 6.8967 |
| |f4/f| | 3.5695 | 3.9164 | 4.2853 | 16.6957 | 15.4785 |
| f6/f | 1.3932 | 1.2433 | 1.4054 | 0.8774 | 0.8948 |
| f7/f | −0.7223 | −0.6951 | −0.7829 | −0.6803 | −0.6753 |
| TTL/f | 1.1121 | 1.1113 | 1.2540 | 1.1215 | 1.1161 |
| f2/f3 | −0.2901 | −0.3046 | −0.3127 | −0.2461 | −0.2821 |
| BFL/f | 0.1711 | 0.1722 | 0.1941 | 0.1703 | 0.1660 |
| D1/f | 0.0325 | 0.0317 | 0.0372 | 0.0308 | 0.0314 |
| FOV | 78.7 | 78.7 | 78.7 | 78.7 | 78.7 |
| Fno | 1.87 | 1.86 | 1.86 | 1.79 | 1.79 |
| TTL/(2*Img HT) | 0.6614 | 0.6609 | 0.6609 | 0.6608 | 0.6576 |
| f12/f | 1.2225 | 1.2207 | 1.3810 | 1.3029 | 1.3124 |

As set forth above, according to an embodiment in the present disclosure, an optical imaging system is capable of having high resolution and a small size in a direction from an object side of the optical imaging system to an imaging plane of the optical imaging system.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens having positive refractive power, a convex object-side surface in a paraxial region thereof and a concave image-side surface in a paraxial region thereof;
a second lens having negative refractive power, a convex object-side surface in a paraxial region thereof and a concave image-side surface in a paraxial region thereof;
a third lens having positive refractive power and a convex image-side surface in a paraxial region thereof;
a fourth lens having negative refractive power, a concave object-side surface in a paraxial region thereof, and a concave image-side surface in a paraxial region thereof;
a fifth lens having positive refractive power;
a sixth lens having a concave image-side surface in a paraxial region thereof; and
a seventh lens having negative refractive power,
wherein the first to seventh lenses are sequentially arranged from an object side,
wherein the optical imaging system has a total of seven lenses,
wherein f3/f>1.5 and |f4/f|>3.0 are satisfied, where f is an overall focal length of the optical imaging system, f3 is a focal length of the third lens, and f4 is a focal length of the fourth lens,
wherein v1−v3<25 is satisfied, where v1 is an Abbe number of the first lens, and v3 is an Abbe number of the third lens, and
wherein TTL/(2*Img HT)<0.7, where a distance on an optical axis from an object-side surface of the first lens to an imaging plane of an image sensor is TTL, and half of a diagonal length of the imaging plane of the image sensor is Img HT.

2. The optical imaging system of claim 1, wherein the third lens comprises a convex object-side surface in a paraxial region thereof.

3. The optical imaging system of claim 1, wherein the sixth lens comprises a convex object-side surface in a paraxial region thereof.

4. The optical imaging system of claim 3, wherein the seventh lens comprises a concave image-side surface in a paraxial region thereof.

5. The optical imaging system of claim 1, wherein $0<f1/f<2.0$ is satisfied, where f1 is a focal length of the first lens.

6. The optical imaging system of claim 1, wherein $-10.0<f2/f<0$ is satisfied, where f2 is a focal length of the second lens.

7. The optical imaging system of claim 1, wherein $-2.0<f2/f3<0.0$ is satisfied, where f2 is a focal length of the second lens.

8. The optical imaging system of claim 1, wherein $25<v1-v2<45$ is satisfied, where v1 is an Abbe number of the first lens, and v2 is an Abbe number of the second lens.

9. The optical imaging system of claim 1, wherein $TTL/f<1.4$ is satisfied, where TTL is a distance on an optical axis from the object-side surface of the first lens to an imaging plane of an image sensor, and
BFL/f<0.4 is satisfied, where BFL is a distance on the optical axis from an image-side surface of the seventh lens to the imaging plane of the image sensor.

10. The optical imaging system of claim 1, wherein $D1/f<0.1$ is satisfied, where D1 is a distance on the optical axis from the image-side surface of the first lens to the object-side surface of the second lens.

11. The optical imaging system of claim 1, wherein $Fno<1.9$ is satisfied, where Fno is an F-number of an optical imaging system.

12. The optical imaging system of claim 1, wherein all of object-side surfaces and image-side surfaces of the first to seventh lenses are aspherical.

13. The optical imaging system of claim 1, wherein at least one inflection point is formed on an object-side surface of the seventh lens.

14. The optical imaging system of claim 1, wherein at least one inflection point is formed on an image-side surface of the seventh lens.

15. The optical imaging system of claim 1, wherein a refractive index of one or more of the first to seventh lenses is 1.66 or more.

16. The optical imaging system of claim 15, wherein refractive indices of the second lens and the fourth lens are 1.66 or more.

* * * * *